United States Patent
Post et al.

(10) Patent No.: US 7,308,889 B2
(45) Date of Patent: Dec. 18, 2007

(54) HIGH PRESSURE GASEOUS FUEL SUPPLY SYSTEM FOR AN INTERNAL COMBUSTION ENGINE AND A METHOD OF SEALING CONNECTIONS BETWEEN COMPONENTS TO PREVENT LEAKAGE OF A HIGH PRESSURE GASEOUS FUEL

(75) Inventors: Adrian J. Post, Surrey (CA); Thomas C. Brook, Shawnigan Lake (CA)

(73) Assignee: Westport Power Inc., Vancouver, B.C. (CA)

( * ) Notice: Subject to any disclaimer, the term of this patent is extended or adjusted under 35 U.S.C. 154(b) by 0 days.

(21) Appl. No.: 11/277,013

(22) Filed: Mar. 20, 2006

(65) Prior Publication Data

US 2006/0213488 A1    Sep. 28, 2006

Related U.S. Application Data

(63) Continuation of application No. PCT/CA2004/001667, filed on Sep. 10, 2004.

(30) Foreign Application Priority Data

Sep. 23, 2003    (CA) .................................... 2441641

(51) Int. Cl.
    *F02B 43/00*    (2006.01)
(52) U.S. Cl. .................... 123/527; 123/27 GE
(58) Field of Classification Search .......... 123/27 GE, 123/527
    See application file for complete search history.

(56) References Cited

U.S. PATENT DOCUMENTS 4,191,818 A    3/1980    Illers et al.

(Continued)

FOREIGN PATENT DOCUMENTS

DE    4205887 A1    9/1993

(Continued)

OTHER PUBLICATIONS

Parker O-Ring Handbook, from Parker Hannifin Corporation, O-Ring Division. pp. 2-12, 3-27,3-31,7-28. Copyrignt 2001.☐☐☐☐.*

(Continued)

*Primary Examiner*—Noah P. Kamen
(74) *Attorney, Agent, or Firm*—McAndrews, Held & Malloy, Ltd.

(57) ABSTRACT

A high-pressure fuel system supplies gaseous fuel to an internal combustion engine. Gaseous fuel pressure within the system is at least 17 MPa during normal operation. The system comprises a number of components and conduits and at least one resilient member for sealing at an interface between two components. The resilient member consists essentially of thermoplastic polyurethane. A corresponding method provides sealing between components containing gaseous fluids at pressures that can be above 17 MPa, in which the gaseous fluids routinely undergo rapid reductions in pressure. The method comprises disposing a resilient member, which consists essentially of thermoplastic polyurethane, at an interface between the components. Gas pressure fluctuations can occur during operation of the components or when the high-pressure gas is vented from the components upon shut down of the high-pressure system. A particularly suitable application for the present method is high-pressure gaseous fuel supply systems for internal combustion engines.

40 Claims, 5 Drawing Sheets

U.S. PATENT DOCUMENTS

| | | | |
|---|---|---|---|
| 4,664,362 A | 5/1987 | Hennells | |
| 4,742,801 A * | 5/1988 | Kelgard | 123/27 GE |
| 4,956,439 A | 9/1990 | Tong et al. | |
| 5,648,430 A | 7/1997 | Chiodini et al. | |
| 5,752,487 A | 5/1998 | Harrell et al. | |
| 5,823,446 A | 10/1998 | Bennett et al. | |
| 5,874,506 A | 2/1999 | Tatsu et al. | |
| 6,016,834 A * | 1/2000 | Leidl | 137/571 |
| 6,073,938 A * | 6/2000 | Abe et al. | 277/654 |
| 6,168,168 B1 | 1/2001 | Brown | |
| 6,270,024 B1 | 8/2001 | Popp | |
| 6,290,235 B1 | 9/2001 | Albertson | |
| 6,298,833 B1 | 10/2001 | Douville et al. | |
| 6,302,337 B1 | 10/2001 | Kimmel | |
| 6,446,978 B1 | 9/2002 | Halling et al. | |
| 6,582,824 B1 | 6/2003 | Weigl et al. | |
| 2002/0073970 A1 | 6/2002 | Lorraine | |

FOREIGN PATENT DOCUMENTS

| | | |
|---|---|---|
| EP | 1209175 A1 | 5/2002 |
| JP | 11-279284 A2 | 10/1999 |
| WO | WO 01/79685 A2 | 10/2001 |

OTHER PUBLICATIONS

New Advances in Polyurethane O-Ring Technology, Rick Hudson, HudsonOnline, Hudson Highlights Nov./Dec. 2000.*

* cited by examiner

HIGH PRESSURE GASEOUS FUEL SUPPLY SYSTEM FOR AN INTERNAL COMBUSTION ENGINE AND A METHOD OF SEALING CONNECTIONS BETWEEN COMPONENTS TO PREVENT LEAKAGE OF A HIGH PRESSURE GASEOUS FUEL

CROSS-REFERENCE TO RELATED APPLICATION(S)

This application is a continuation of International Application No. PCT/CA2004/001667, having an international filing date of Sep. 10, 2004, entitled "High Pressure Gaseous Fuel Supply System For An Internal Combustion Engine And A Method Of Sealing Connections Between Components To Prevent Leakage Of A High Pressure Gaseous Fuel". International Application No. PCT/CA2004/001667 claimed priority benefits, in turn, from Canadian Patent Application No. 2,441,641 filed Sep. 23, 2003. International Application No. PCT/CA2004/001667 is hereby incorporated by reference herein in its entirety.

FIELD OF THE INVENTION

The present invention relates to a high-pressure gaseous fuel supply system for an internal combustion engine and a method of sealing connections at interfaces between components to prevent leakage of a high-pressure gas. More particularly, the subject apparatus and method provides a seal for gaseous fluids in environments where the seal can be exposed to constant temperatures as high as 200° C. (about 392° F.) and/or for applications where the gas pressure fluctuates between high pressures when the system is supplying high pressure gas and much larger pressure drops when the system is shut down.

BACKGROUND OF THE INVENTION

Developments in internal combustion engine technology have shown that compression ignition engines, commonly referred to as diesel-cycle engines, can be fuelled by gaseous fuels instead of liquid diesel fuel without sacrifices in performance or efficiency. Examples of such gaseous fuels include natural gas, methane, propane, ethane, gaseous combustible hydrocarbon derivatives and hydrogen. Using such gaseous fuels instead of liquid diesel fuel generally results in cost, availability and emissions benefits.

By injecting a gaseous fuel directly into an engine's combustion chamber near the end of the compression stroke, it is possible to achieve substantially the same performance and efficiency as a diesel engine. However, a challenge of this approach is that the gaseous fuel must be delivered to the combustion chamber at a pressure that overcomes the high in-cylinder pressures that are present during this part of the engine cycle. To practice this method, gaseous fuel pressure is preferably between at least 17 and up to 70 MPa (between at least 2500 psi and up to 10,000 psi).

Conventional gaseous-fuelled engines which are based on the Otto cycle typically inject the gaseous fuel into the intake manifold where the gaseous fuel can be premixed with the intake charge. The pressure within the intake manifold is much lower than the pressures that can occur within the combustion chamber, so pressure within the gaseous fuel supply system are normally less than 0.7 MPa (about 100 psi). By associating the gaseous fuel injection valve with the intake manifold, the fuel supply system components and the seals between components are not exposed to the higher temperatures that can occur nearer to the combustion chamber. However, present day gaseous-fuelled engines have been unable to match the performance and efficiency of diesel-fuelled engines.

With present day gaseous fuelled engines there is no need to supply gaseous fuel at pressures above 17 MPa (about 2500 psi) and no one has addressed the problem of sealing connections between components to prevent the leakage of a gaseous fuel supplied at such pressures, especially for an application where the gas pressure can also quickly fluctuate between very high pressures and much lower pressures.

For example, during normal operation of an internal combustion engine, if the gaseous fuel is injected directly into the combustion chamber, fuel pressure in a fuel supply system can vary within a range of pressures between 17 MPa and 70 MPa and changes in pressure can occur with a frequency of between 1 and 10 hertz. When such an engine is shut down, the fuel supply system can be vented, rapidly reducing the pressure from operating pressure to atmospheric pressure. Upon shut down, while it is desirable to slow the rate at which fuel pressure is reduced, fuel pressure can still fall from maximum pressure to about atmospheric pressure in less than 20 seconds, and more commonly between 1 and 8 seconds.

Conventional diesel engines inject liquid diesel at even higher pressures than engines fuelled with gaseous fuel because fuel pressure is employed to vaporize the liquid fuel. In a modem diesel-fuelled engine, the liquid fuel can be introduced into an engine's combustion chamber at an injection pressure that is between 70 and 207 MPa (between about 10,000 psi and 30,000 psi). New diesel engines are being introduced with even higher fuel injection pressures to improve atomization for reduced emissions.

Seals used in diesel fuel systems comprise o-ring seals that are commonly made from fluoroelastomers. An example of a suitable fluoroelastomer is the product sold by DuPont Dow Elastomers LLC under the tradename Viton®. Buna-N Nitrile Rubber can also be used.

Seals comprising fluoroelastomers and Buna-N Nitrile have been tested for sealing connections between components of a high-pressure gaseous fuel system that is operable with a maximum gaseous fuel pressure between 20 MPa (about 3000 psi) and 42 MPa (about 6000 psi). These seals were found to fail after a short time. It is believed that the pressure fluctuations between operating pressure and atmospheric pressure was the primary cause of failure. The failure mode was consistent with the characteristics of explosive decompression, which can occur when a material is subjected to rapid changes in gas pressure. Because the molecular size of fuel gas constituents is much smaller than the molecular size of liquid fuel constituents, a significant amount of gaseous fuel can be absorbed into a seal member when it is exposed to high-pressure gaseous fuel. When the fuel lines are vented, or gaseous fuel pressure is otherwise rapidly reduced, the gaseous fuel is released from the o-ring seal and the o-ring seal material can break to allow the absorbed gaseous fuel to escape. This understanding of the seal failures explains why such seal failures are not encountered when the same seal material is used for conventional liquid fuel applications when the seals can be exposed to even higher pressures.

The problem of explosive decompression and the resulting failure of resilient static or dynamic seals does not occur in all pressurized fluid systems. For example, in environments where rapid reductions in gas pressure can be avoided, explosive decompression is not a problem. The problem of explosive decompression can occur when the fluid is a gas, which is at relatively high pressures and when the system is subjected to rapid pressure fluctuations. Accordingly, explosive decompression is not a common problem. There are other variables that can influence the susceptibility of a material to failure because of explosive decompression, such as the porosity of the material, and the ability of the gas to be absorbed into the pore volume at system pressure. Manufacturers of seals do not normally rate a seal material's effectiveness against explosive decompression, making difficult the selection of an appropriate seal material.

SUMMARY OF THE INVENTION

A fuel system is provided for supplying a gaseous fuel to an internal combustion engine, wherein pressure of the gaseous fuel within the system is at least 17 MPa during normal operation and the pressure routinely undergoes rapid reductions in pressure. Components of the fuel system comprise:
(a) a pressure increasing module;
(b) a fuel conditioning module;
(c) a fuel injection valve for injecting the fuel directly into a combustion chamber of the internal combustion engine;
(d) conduits for conveying the gaseous fuel from the pressure increasing module to the pressure regulating module, and from the pressure regulating module to the fuel injection valve; and
(e) a resilient member for sealing at an interface between two components, the resilient member consisting essentially of thermoplastic polyurethane.

The thermoplastic polyurethane preferably has a chemical backbone material that is selected from the group consisting of p-phenylenediisocyanate, diphenyldiisocyante, and diphenylmethane diisocyanate, and when constant temperature exposure for the seal exceeds 130° C., the chemical backbone material is more preferably, p-phenylenediisocyanate.

To provide a fluid tight seal, the resilient member is preferably held in compression when installed at the interface. The resilient member can be in the simple shape of a closed circular ring, which is advantageous for strength and ease of manufacturing. In cross-section, the resilient member can be round. However, those skilled in the technology will understand that other cross-section shapes can also be used with similar results. For example, for a face-seal application the resilient member could also be in the form of a gasket or a ring seal can be employed with a cross or "X" shaped cross-section.

The components can be shaped to receive and hold the resilient member at a location at the interface where sealing is desired. For example, the interfacing surfaces can be grooved to accept a ring seal or gasket.

In preferred embodiments, the gaseous fuel can be a combustible hydrocarbon derivative. For example, the gaseous fuel can be selected from the group consisting of natural gas, methane, propane, ethane. The gaseous fuel could also be hydrogen or a blend of any of the aforementioned gaseous fuels. For example, a blend of 20% hydrogen and 80% natural gas has been tested as a fuel in internal combustion engines as a means for reducing the level of regulated emissions from the engine's exhaust system.

The fuel conditioning module comprises a pressure regulating device to control the pressure of the gaseous fuel within the fuel injection valve. In a preferred embodiment, the pressure regulating device is operable to control fluid pressure within the fuel injection valve to fluctuate within a range of pressures between about 17 MPa and up to about 70 MPa during normal operation of the components and more preferably gas pressure is controllable to be between at least 19 MPa and 35 MPa. The pressure regulating device can be a dome-loaded regulator with a piston moveable under the influence of a control fluid. The resilient member can provide a dynamic seal between the piston and the cylinder within which it is disposed.

When the engine is shut down, fluid pressure within the components is preferably ventable to atmospheric pressure. The fuel conditioning module can comprise a vent that is openable to reduce the pressure within the components downstream from the fuel conditioning module when the fuel system is shut down. That is, the high pressure fuel is vented from the fuel injection valves and the fuel rails that supply high pressure fuel to the fuel injection valves. Fuel can be held at high pressure upstream of the fuel conditioning module, for example, in the accumulator vessel.

The fuel conditioning module can further comprise a gas filter for separating contaminants from the gaseous fuel.

In a preferred embodiment, the fuel system comprises an electronic controller, which is operable to control the operation of the fuel conditioning module to regulate the pressure of the fuel supplied to the fuel injection valves.

In a fuel system that stores the fuel in liquefied form, the pressure increasing module can be a pump for pumping liquefied gases. Such a fuel system further comprises a vaporizer for converting liquefied gas to the gaseous phase after it has been discharged from the pump.

In a fuel system that stores the fuel in gaseous form, the pressure increasing module can be a compressor. The compressor can be mechanically driven by the engine, or hydraulically driven for more independent operation. A preferred embodiment of a hydraulically driven compressor employs a free-floating piston.

A method is provided for sealing at an interface between components of a fuel system for supplying a gaseous fuel to an internal combustion engine at pressures that can be above 17 MPa, and wherein the gaseous fuel routinely undergoes rapid reductions in pressure. The method comprises disposing a resilient member at the sealing interface. The resilient member consists essentially of thermoplastic polyurethane.

With this method the thermoplastic polyurethane preferably has a chemical backbone material that is selected from the group consisting of p-phenylenediisocyanate, diphenyldiisocyante, and diphenylmethane diisocyanate, and when the resilient member is exposed to constant temperatures above 130° C., the chemical backbone material is more preferably p-phenylenediisocyanate.

When the engine is running under load, the rapid reductions in pressure can occur with a frequency between 1 and 10 hertz. The pressure of the gaseous fuel within the components can fluctuate within a range of pressures between about 17 MPa and up to about 70 MPa during normal operation of the engine, but more preferably the pressure within the fuel system is controllable to be between 19 MPa and 35 MPa.

The preferred method comprises venting the fuel rails and the fuel injection valves to reduce the pressure therein to atmospheric pressure when the engine is shut down. The resilient member can provide a static seal between a fuel injection valve and the cylinder head. Another resilient member can also provide a static seal for a plug that seals a bore made in the cylinder head for use as a fuel rail for delivering high pressure gas to the fuel injection valves from the fuel supply system.

The method further comprises compressing the resilient member when it is installed at the interface for a stronger seal. The resilient member can be disposed in a groove shaped to cooperate with the shape of the resilient member to hold it at a location where sealing is desired. The resilient member can be employed as a static or dynamic seal.

A method is provided of sealing between components that contain gaseous fluids at pressures that can be above 17 MPa, wherein the gaseous fluids routinely undergo rapid reductions in pressure, and the components can have a constant surface temperature up to 200° C. at an interface between components where sealing is desired. The method comprises disposing a resilient member consisting essentially of thermoplastic polyurethane to provide a seal at the interface.

DETAILED DESCRIPTION OF PREFERRED EMBODIMENT(S)

In order to introduce a gaseous fuel directly into a combustion chamber near the end of the compression stroke, it is necessary to supply the fuel to a fuel injection valve at a pressure that is between at least 17 MPa and about 70 MPa. The fuel injection valve for introducing the gaseous fuel directly into the combustion chamber is typically inserted through the cylinder head, with a nozzle tip projecting into the combustion chamber. During engine operation, the constant temperature of the cylinder head around the fuel injection valve and its associated component seals can approach about 200° C. (about 392° F.), particularly where the fuel injection valve is closest to the combustion chamber and the exhaust manifold ports. Since conventional gaseous-fuelled engines have employed lower pressure fuel systems associated with forming a premixed fuel charge in the intake manifold, the problem of providing suitable seals for handling a gaseous fuel at higher pressures and temperatures in an engine environment has not been previously addressed. Therefore, a suitable seal material for reliably containing gaseous fuels at rapidly fluctuating pressures that can exceed 17 MPa and at temperatures up to about 200° C. is required for sealing at the connections and interfaces between components.

Some common seal materials are not normally considered suitable for the present application if they degrade or melt when exposed to such conditions. For example, polyurethane is not normally considered to be a good choice for constant exposure to temperatures above 130° C. (266° F.). For example, the polyurethane material sold under the trade-name Disogrin® by Simrit, a division of Freudenberg-NOK, is recommended for use where the temperature can be constant in a range between 4° C. to about 121° C. (40° F. to 250° F.), with a peak temperature of about 149° C. (300° F.). Recently, polyurethane materials using a chemical backbone comprising p-phenylenediisocyanate, such as the material sold under the trade-name P4300 by Parker have become commercially available that can be used for applications where the material is exposed to constant temperatures as high as 200° C. Accordingly, processes and compositions are now known for making a polyurethane that has a higher melting point compared to previously known polyurethane materials.

Unlike conventional engine seals made from fluoroelastomers or Buna-N Nitrile Rubber, polyurethane materials can be made resistant to explosive decompression when subjected to the normal conditions found at the seal interfaces of the present high-pressure gaseous fuel supply system for internal combustion engines.

Figure 1:
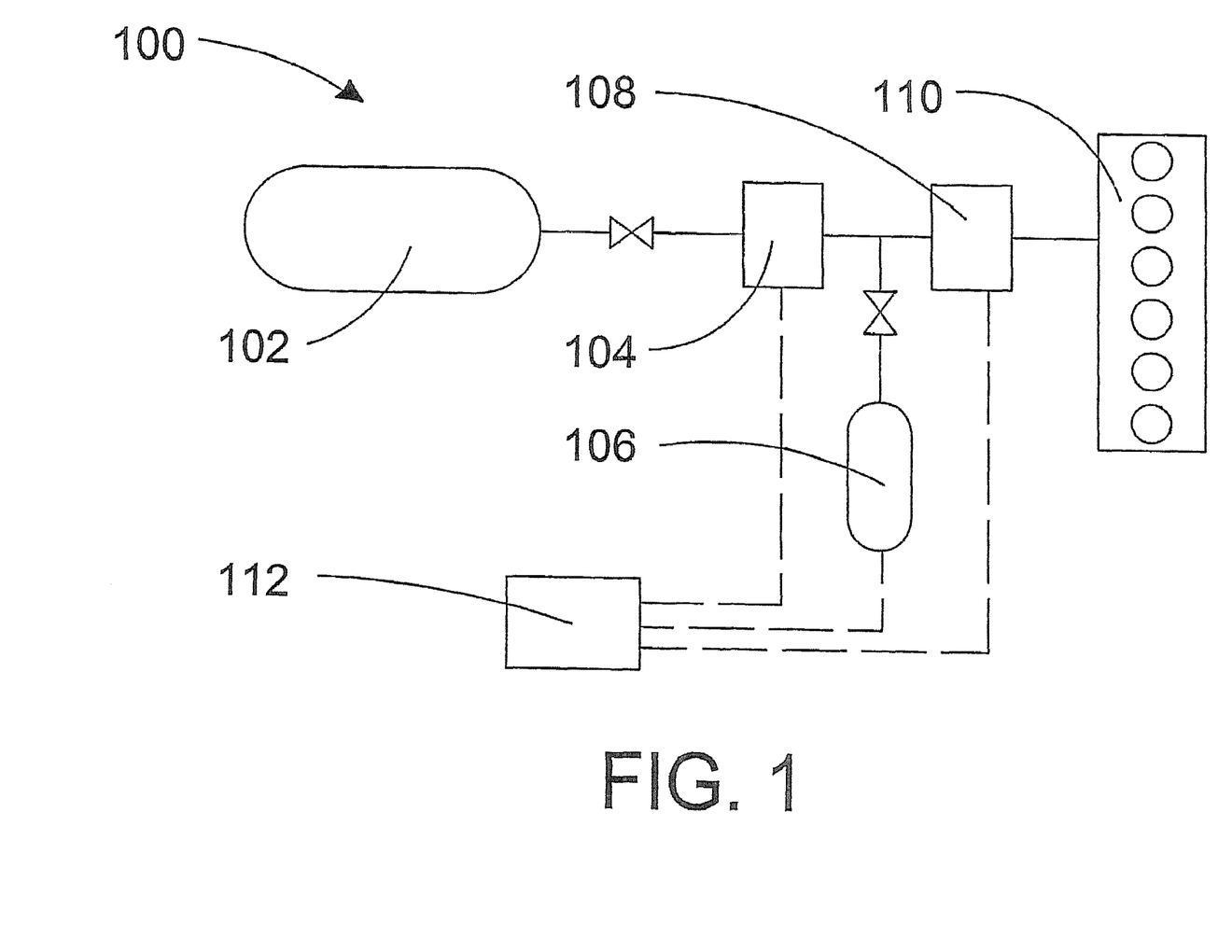
FIG. 1 is a schematic diagram of a fuel supply system for a gaseous-fuelled engine designed to match or exceed the performance and efficiency of a conventional diesel engine. In this embodiment the fuel is stored inside a pressure vessel in gaseous form at high pressure (typically at 25 MPa (about 3600 psi) when full and less than 2 MPa (about 300 psi) when considered empty).

By way of example, the present method can be directed to providing sealing for a system such as the one illustrated by the schematic diagram of FIG. 1, which illustrates high-pressure fuel supply system 100, comprising a number of components that need to be joined to each other with gas-tight connections to prevent leakage of fuel. Some of the seals, such as the ones between the fuel injection valve and the engine cylinder head can be exposed to temperatures as high as 200° C. when the engine is running.

In the illustrated embodiment of FIG. 1, the fuel is stored at high pressure in compressed gaseous form. For example, when the fuel is natural gas, this type of system is normally known as a CNG fuel system. The illustrated CNG fuel system comprises pressure rated fuel storage tank 102, compressor 104, accumulator vessel 106, fuel conditioning module 108, and a fuel injection valve (not shown) for each of the engine's combustion chambers. The fuel injection valves are preferably inserted into a mounting hole provided in cylinder head 110.

As the engine consumes fuel, the pressure within fuel storage tank 102 declines and compressor 104 is relied upon to supply the gaseous fuel to cylinder head 110 at the desired injection pressure. CNG storage tanks are typically filled to a pressure of about 25 MPa (about 3600 psi) and the storage tank is considered empty when the pressure drops to about 2 MPa (about 300 psi) because at this pressure it is too difficult for compressor 104 to boost the pressure to the desired level. In terms of fuel mass, when the storage tank is empty it will still contain about 7% of the original amount of fuel. Because the present fuel supply system is designed for supplying gaseous fuel for direct injection into the engine's combustion chamber at high pressure, the fuel supply system components downstream from compressor 104 must be capable of handling gaseous fuel at pressures that fluctuate between injection pressure and atmospheric pressure, since at least some of the fuel supply system is preferably vented when the engine is shut down.

For raising the fuel pressure to the requisite magnitude and in the needed quantities, a positive displacement compressor is preferred, such as one that uses a reciprocating piston. Such a compressor can be mechanically driven by the engine itself, or in another preferred embodiment, a slower speed hydraulically actuated free-floating piston compressor can be employed. An advantage of a hydraulic drive is that compressor speed need not be coupled to engine speed, and a lower speed can reduce heat gain during compression yielding higher compressor efficiencies and improved sealing and durability. Controller 112 can be programmed to adjust compressor speed in response to engine load and/or pressure in accumulator vessel 106.

Accumulator vessel 106 is employed to provide a buffer volume of high-pressure gaseous fuel. Accumulator vessel 106 is particularly useful when engine loads are dynamic and over a wide range. For example, if there is a sudden increase in the engine load and a consequent increase in the fuel requirements, accumulator vessel 106 ensures that there is enough high-pressure fuel available. In the schematic of FIG. 1, a signal line from a pressure sensor is shown between accumulator vessel 106 and controller 112, but those skilled in this technology will understand that the same purpose could be achieved by a sensor disposed along the piping between compressor 104 and fuel conditioning module 108.

Fuel conditioning module 108 comprises a pressure regulator, which is employed to control the pressure of the gaseous fuel that is supplied to the fuel injection valve. Controller 112 can be programmed to command a specific fuel injection pressure that is dynamically responsive to changing engine operating conditions. Fuel conditioning module 108 can further comprise a gas filter for trapping contaminants in the fuel stream, a fuel shut off, and a vent for relieving pressure from fuel supply system 100, for example, when the engine is shut down.

The fuel injection valve preferably extends through cylinder head 110 with a nozzle projecting into the combustion chamber so that gaseous fuel is introducible directly into the combustion chamber. Unlike a premixed charge, by injecting the fuel directly into the combustion chamber, the fuel can be injected after the intake valve is closed, allowing the timing for the fuel to be controlled to reduce the likelihood of potentially damaging premature detonation, also known as "engine knock", enabling the engine to have a higher compression ratio for improved engine performance.

As shown in FIG. 1, conduits can be used to fluidly connect the components or the components can be joined directly to each other, such as the components of fuel conditioning module 108. Fuel conditioning module 108 can also be mounted directly to the engine's cylinder head, with an interfacing surface such as the one depicted in FIG. 5, described below. A conduit can be in the form of a pipe or it can be a passage through the body of an engine component such as the engine's cylinder head. Depending upon the engine and the space available for the fuel supply system, if practical and economical, some components can be integrated with each other to obviate the need for an interconnecting conduit and associated seals. Gas-tight seals are employed at interfaces between components and conduits.

Figure 2:
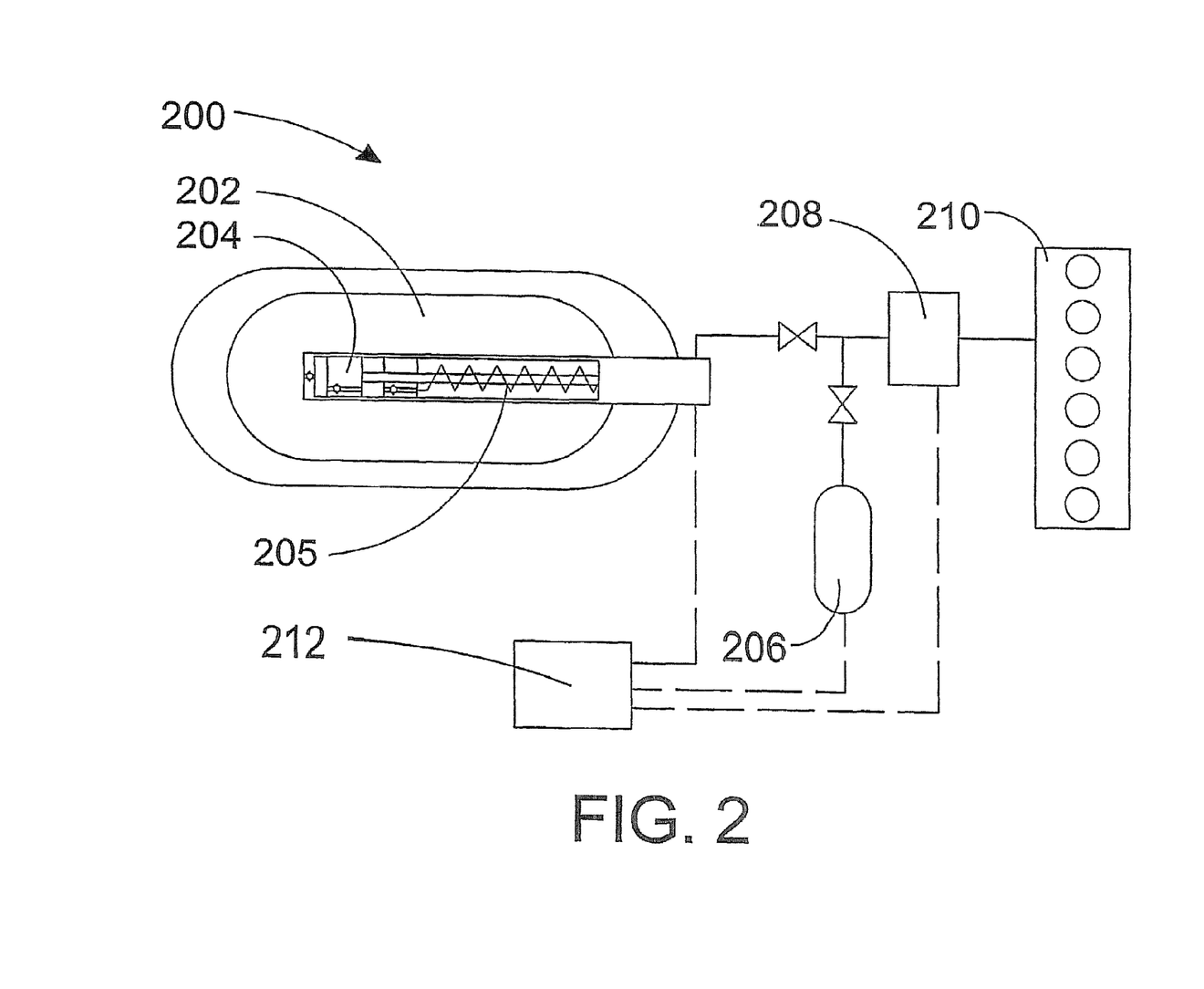
FIG. 2 is a schematic diagram of another embodiment of a fuel supply system for a gaseous-fuelled engine. In this embodiment the fuel is stored inside a thermally insulated vessel in liquefied form.

In the illustrated embodiment of fuel supply system 200 shown in FIG. 2, the fuel is stored in liquefied form in a thermally insulated storage tank designed for storing a liquefied gas at a cryogenic temperature. For example, when the fuel is natural gas, this type of system is normally known as a LNG fuel system. The illustrated LNG fuel system can comprise one or more fuel storage tanks 202, fuel pump 204 for pumping liquefied gas, vaporizer 205 for heating the liquefied gas and converting it to gaseous form, accumulator vessel 206 for storing a quantity of gaseous fuel at high pressure to ensure an adequate supply of fuel that is ready to satisfy the engine's fuel requirements, fuel conditioning module 208 for controlling the pressure of the fuel delivered to the engine, and at least one fuel injection valve for each combustion chamber for introducing the gaseous fuel directly into each one of the combustion chambers.

In the embodiment of FIG. 2, fuel pump 204 and vaporizer 205 are disposed within the insulated cryogen space of storage tank 202. People skilled in the technology will understand that the pump and vaporizer can also be disposed outside storage tank 202 if the conduits between the pump and tank are suitably insulated. In another arrangement, instead of being disposed directly inside the cryogen spaced, the fuel pump can be disposed in the vacuum space that surrounds the cryogen space.

Downstream from vaporizer 205 the fuel is in gaseous form and fuel conditioning module 208 operates essentially in the same manner as fuel conditioning module 108 of FIG. 1.

Like the embodiment of FIG. 1, the fuel injection valves are each preferably inserted into a mounting hole provided in cylinder head 210, with at least one fuel injection valve associated with each combustion chamber.

Figure 3:
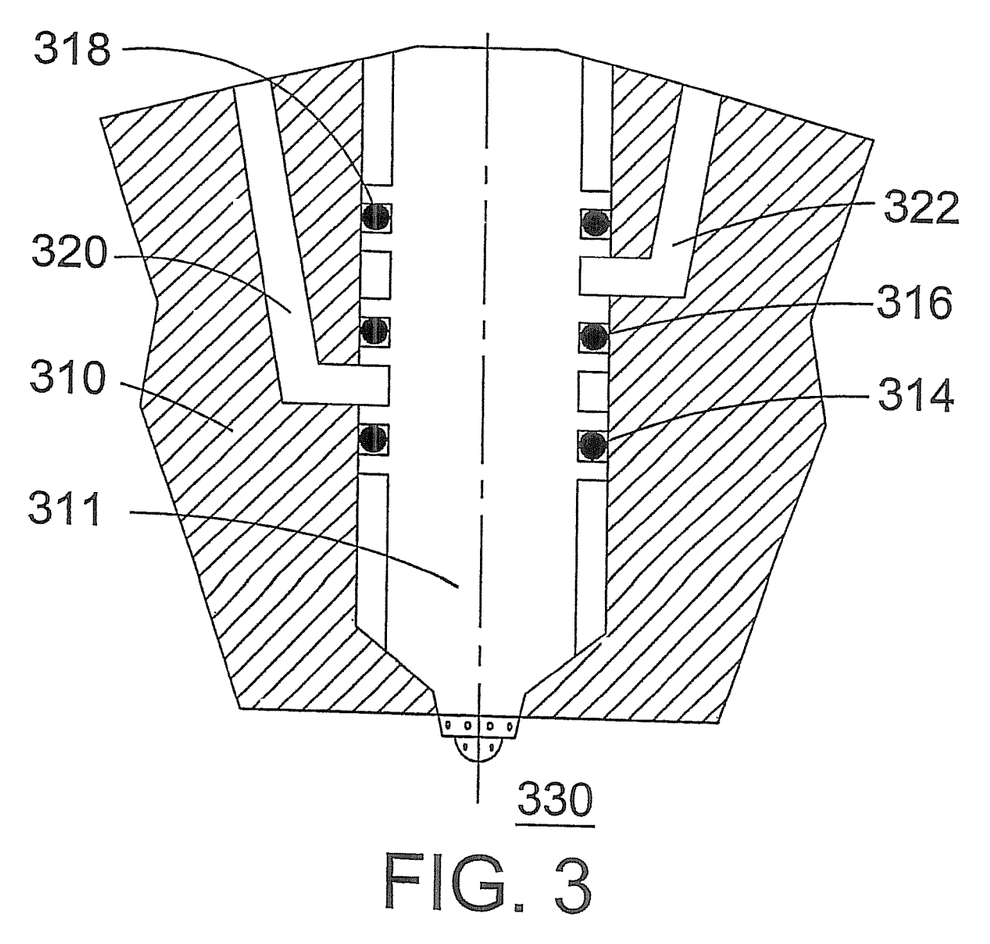
FIG. 3 is a cross-sectional view through a portion of the cylinder head of an internal combustion engine, showing the seals at the interface between a fuel injection valve (shown in outline) and the cylinder head. In this embodiment the fuel passage for supplying fuel to the fuel injection valve comprises a passage formed within the body of the cylinder head.

FIG. 3 shows a cross section view of a part of the engine's cylinder head where the fuel injection valve is mounted. The arrangement of FIG. 3 can be used with the embodiments of FIG. 1 or 2. With reference to FIG. 3, fuel injection valve 311 is mounted inside a bore in cylinder head 310. Conduit 320 is formed in cylinder 310 head to fluidly connect fuel injection valve 311 to the fuel supply system. Polyurethane seals in the form of o-rings 314 and 316 are deployed on either side of conduit 320 to prevent the high pressure gaseous fuel from leaking at the interface between fuel injection valve 311 and cylinder head 310.

If fuel injection valve 311 is a combined gaseous and liquid (pilot) fuel injection valve, conduit 322 can be employed to deliver liquid fuel to fuel injection valve 311. In the case of a hydraulically actuated single-fuel injection valve, conduit 322 can be used to deliver the hydraulic fluid to fuel injection valve 311. Conduit 322 can also be employed for other purposes, such as delivering a lubricant, a coolant, or a sealing liquid. O-ring seal 318 is disposed on the upper side of the opening into conduit 322 to prevent leakage on that side.

The location of the fuel injection valve exposes seals 314, 316 and 318 to heat emanating from combustion chamber 330 and the exhaust manifold passages (not shown), which are provided through cylinder head 310. For seals in these locations, a polyurethane seal material can be made that can withstand exposure to constant temperatures of at least 200° C.

Figure 4:
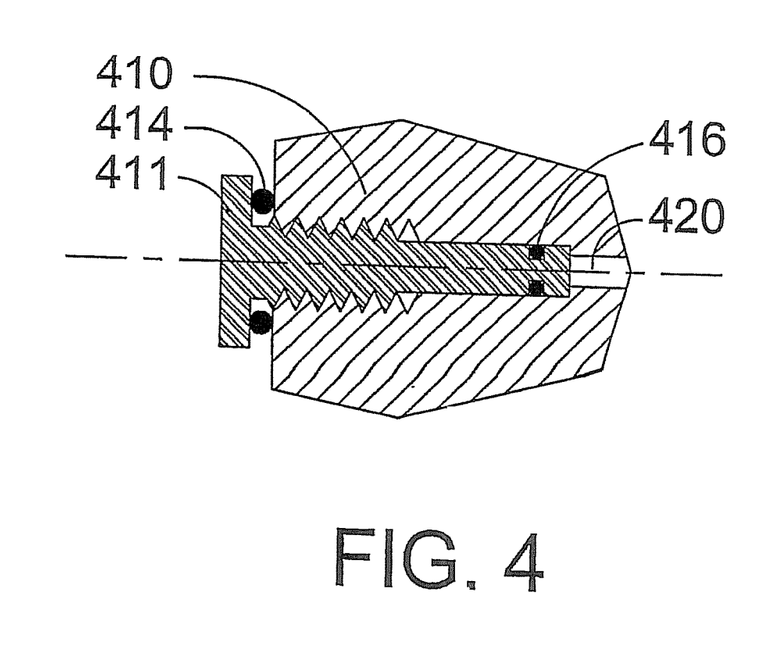
FIG. 4 is a cross-sectional view of a portion of the cylinder head where a bore which is made for supplying high pressure fuel to the fuel injection valves is plugged and sealed.

FIG. 4 is a cross section view of a portion of an engine's cylinder head. Fuel supply passages for delivering gaseous fuel to an engine's injection valves can be provided by bores formed in cylinder head 410, illustrated by bore 420. Plug 411, face seal 414 and o-ring seal 416 can be employed to seal the end of bore 420. At this location the temperature may not be as high as the temperature at the seal location shown in FIG. 3, but constant exposure to high temperature and rapid changes in gas pressure still make conventional fluoroelastomer or Buna-N nitrile rubber seal materials unsuitable for this application. Seals 414 and 416 can be made from polyurethane, which will not melt at the anticipated operating temperature and which will not degrade because of explosive decompression within the expected service life of the seals. A polyurethane with a chemical backbone comprising p-phenylenediisocyanate is preferred if seals 414 and 416 can be exposed to temperatures higher than 130° C. for extended periods of time during engine operation.

Figure 5:
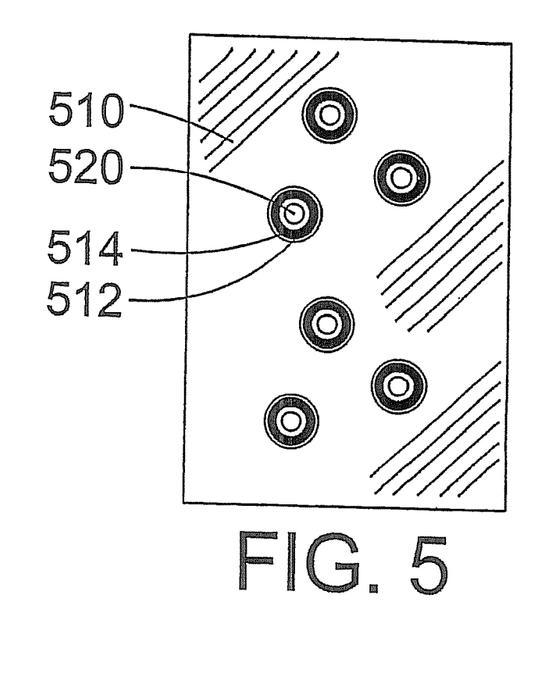
FIG. 5 is an elevation view of a flat surface of a fuel conditioning module that interfaces with an engine for supplying fuel thereto. Seals are disposed in glands for preventing fuel leaks.

In FIG. 5, fuel conditioning module 510 comprises a flat surface that interfaces with an opposite facing flat surface on the cylinder head. In this example, port 520 is aligned with a fuel rail, which is a passage formed within the cylinder head for delivering fuel to a fuel injection valve. As part of the fuel supply system, fuel passing through port 520 can fluctuate between an injection pressure higher than 17 MPa and atmospheric pressure, when the engine is shut down. Sealing member 514 is an o-ring or gasket that is made from polyurethane and disposed within a groove 512, sometimes referred to as a gland, which surrounds port 520 so that sealing member 514 can provide a continuous seal around port 520. Again, a polyurethane with a chemical backbone comprising p-phenylenediisocyanate is preferred if sealing member 514 can be exposed to temperatures higher than 130° C. for extended periods of time during engine operation.

Figure 6:
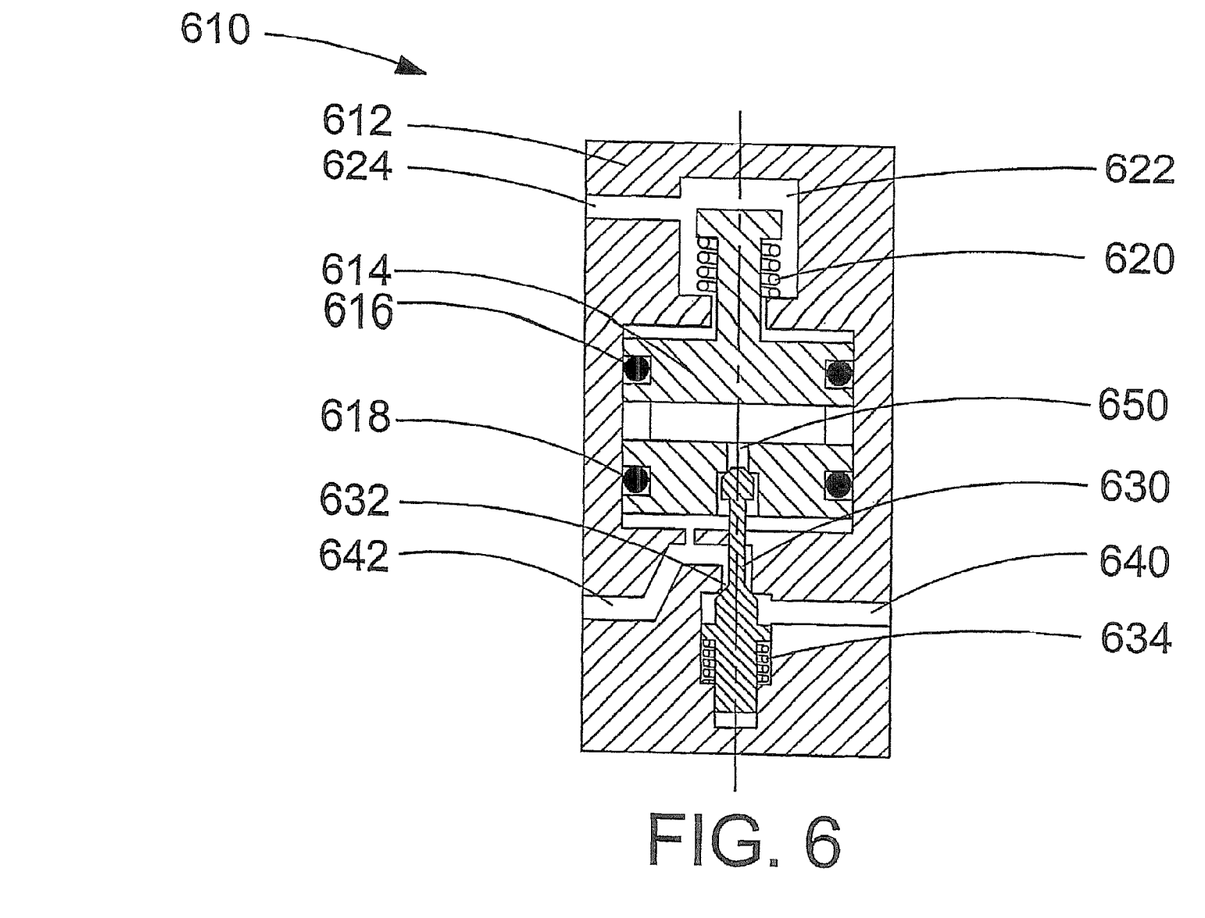
FIG. 6 is a cross-sectional view of a component of a fuel conditioning module that is employed to regulate pressure in the fuel rail that supplies fuel to the fuel injection valves. This component comprises a piston with dynamic seals to prevent leakage of gaseous fuel from the fuel supply system.

FIG. 6 is a cross-section view of a component of the fuel conditioning module, illustrating another part of the fuel supply system where seals are exposed to rapid fluctuations in gas pressure. Component 610 is generally known as a dome-loaded regulator and a number of functions are combined by this particular arrangement. Dome-loaded regulator 610 can be used to regulate fuel pressure and also vent fuel pressure when the engine is shut down.

Dome-loaded regulator 610 comprises body 612 that defines a cylinder chamber within which piston 614 is reciprocable. Piston seals 616 and 618 seal between piston 614 and the cylinder walls. The position of piston 614 is biased by piston spring 620. To control the position of piston 614 a control fluid is introducible into control chamber 622 through port 624. Piston 614 cooperates with needle member 630 to control the size of the opening through orifice 632 thereby regulating the pressure of the gaseous fuel that enters through inlet 640 and exits through outlet 642. Needle spring 634 biases the position of needle member 630.

In a preferred embodiment, dome-loaded regulator 610 is employed to balance the pressure of a gaseous fuel with the pressure of a liquid pilot fuel for a gaseous and liquid fuel injection valve, as described in co-owned U.S. Pat. No. 6,298,833. Liquid pilot fuel acting as the control fluid is directed to control chamber 622 and urges piston 614 downwards against the bias of piston spring 620 when the liquid pilot fuel is at injection pressure. The movement of piston 614 causes a corresponding movement of needle member 630, opening orifice 632. In this example, dome-loaded regulator 610 is preferably calibrated to control the pressure of the gaseous fuel that exits through outlet 642 so that it is about the same as the pressure of the liquid pilot fuel. Increasing the pressure of the liquid pilot fuel results in a further downward movement of piston 614 and a wider opening of orifice 632.

When liquid pilot fuel pressure is reduced, piston 614 moves upwards under the influence of piston spring 620 and flow of the gaseous fuel can be shut off by the upwards movement of needle member 630 under the influence of needle spring 634. When the engine is shut down, liquid pilot fuel pressure is relieved and further upward movement of piston 614 causes it to lift away from needle member 630, opening vent port 650, thereby allowing the high pressure gas to be vented from the fuel supply system between dome-loaded regulator 610 and the fuel injection valves.

Seals 616 and 618 are dynamic seals that seal between reciprocable piston 614 and the cylinder walls. During engine operation, piston 614 can reciprocate with an average frequency of between 1 and 10 hertz. Seal 618 is exposed to the rapidly fluctuating gaseous fuel pressure and must also handle a pressure differential because there is vent pressure on one side and fuel pressure on the other side. Conventional fluoroelastomeric seals or Buna-N nitrile seals failed when employed for this application, but polyurethane seals provide the necessary sealing under these unique conditions, namely conditions where a dynamic seal is required, with a high reciprocating frequency, exposure to rapidly fluctuating gas pressures, and a high pressure differential.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A fuel system for supplying a gaseous fuel to an internal combustion engine, said system comprising a thermoplastic polyurethane material provided at an interface between two components of said system or between parts of one of said components for sealing therebetween, wherein said components comprise:
    (a) a pressure increasing module;
    (b) a fuel conditioning module;
    (c) a fuel injection valve for injecting said fuel directly into a combustion chamber of said internal combustion engine; and
    (d) conduits for conveying said gaseous fuel from said pressure increasing module to said fuel conditioning module, and from said fuel conditioning module to said fuel injection valve, wherein said conduits can be separate components or integral to an engine part, including other ones of said fuel system components.

2. The fuel system of claim 1 wherein pressure of said gaseous fuel within said system is at least 17 MPa during normal operation and said pressure routinely undergoes rapid reductions in pressure.

3. The fuel system of claim 1 wherein said thermoplastic polyurethane has a chemical backbone material that is selected from the group consisting of p-phenylenediisocyanate, diphenyldiisocyante, and diphenylmethane diisocyanate.

4. The fuel system of claim 1 wherein a resilient member, which comprises said thermoplastic polyurethane material, is held in compression when installed at said interface.

5. The fuel system of claim 1 wherein said components are shaped to receive and hold a resilient member, which comprises said thermoplastic polyurethane material, at a location at said interface where sealing is desired.

6. The fuel system of claim 1 wherein a resilient member, which comprises said thermoplastic polyurethane material, is in the shape of a closed circular ring.

7. The fuel system of claim 1 wherein a resilient member, which comprises said thermoplastic polyurethane material, has a circular cross-section.

8. The fuel system of claim 1 wherein said gaseous fuel is a combustible hydrocarbon derivative.

9. The fuel system of claim 1 wherein said gaseous fuel is selected from the group consisting of natural gas, methane, propane, ethane, hydrogen, and blends thereof.

10. The fuel system of claim 1 wherein said fuel conditioning module comprises a pressure regulating device to control the pressure of said gaseous fuel within said fuel injection valve.

11. The fuel system of claim 10 wherein said pressure regulating device is operable to control fluid pressure within said fuel injection valve to fluctuate within a range of pressures between about 17 MPa and up to about 70 MPa during normal operation of said components.

12. The fuel system of claim 10 wherein pressure regulating device is operable to control fluid pressure within said fuel injection valve to be between at least 19 MPa and 35 MPa during normal operation of said components.

13. The fuel system of claim 1 wherein fluid pressure within said components is ventable to atmospheric pressure when said engine is shut down.

14. The fuel system of claim 1 wherein said fuel conditioning module further comprises a vent that is openable to reduce the pressure of said gaseous fuel that is remaining within said components when said engine is shut down.

15. The fuel system of claim 1 wherein fuel conditioning module further comprises a gas filter through which said gaseous fuel flows for separating contaminants from said gaseous fuel and said interface is between said gas filter and connections for fuel passages of said fuel conditioning module.

16. The fuel system of claim 1 wherein operation of said fuel conditioning module is controllable by an electronic controller.

17. The fuel system of claim 1 wherein said components are integral with or in contact with engine parts that can be heated during operation of said engine, whereby at said interface said components can have a constant surface temperature of up to 200° C.

18. The fuel system of claim 17 wherein said thermoplastic polyurethane has a chemical backbone material that comprises p-phenylenediisocyanate.

19. The fuel system of claim 1 wherein said pressure increasing module is a pump for pumping liquefied gases and said fuel system further comprises a vaporizer for converting liquefied gas to a gaseous phase after it has been discharged from said pump.

20. The fuel system of claim 1 wherein said conduits between said fuel conditioning module and said fuel injection valve comprise a bore provided within a cylinder head and a resilient member, which comprises said thermoplastic polyurethane material, provides a static seal at said interface, which is between said fuel injection valve and said cylinder head.

21. The fuel system of claim 20 wherein said conduits between said fuel conditioning module and said fuel injection valve comprise a bore provided within a cylinder head and a resilient member, which comprises said thermoplastic polyurethane material, provides a static seal at said interface, which is between a plug that seals an open end of said bore and said cylinder head.

22. The fuel system of claim 1 wherein said fuel conditioning module comprises a dome-loaded regulator through which said gaseous fuel flows and said resilient member provides a dynamic seal at said interface, which is between a piston of said dome-loaded regulator and a cylinder within which said piston is disposed.

23. A method of sealing at an interface between components or parts of a component of a fuel system for supplying a gaseous fuel to an internal combustion engine at pressures that can be above 17 MPa, wherein said gaseous fuel routinely undergoes rapid reductions in pressure, said method comprising disposing a resilient member that provides a fluid seal at said interface, said resilient member consisting essentially of thermoplastic polyurethane.

24. The method of claim 23 wherein said thermoplastic polyurethane has a chemical backbone material that is selected from the group consisting of p-phenylenediisocyanate, diphenyldiisocyante, and diphenylmethane diisocyanate.

25. The method of claim 23 wherein pressure of said gaseous fuel within said components fluctuates within a range of pressures between about 17 MPa and up to about 70 MPa during normal operation of said components.

26. The method of claim 23 wherein pressure of said gaseous fuel within said components is controllable to be between at least 19 MPa and about 35 MPa during normal operation of said components.

27. The method of claim 23 wherein pressure of said gaseous fuel within said components is ventable to atmospheric pressure when said engine is shut down.

28. The method of claim 23 further comprising compressing said resilient member when installed at said interface.

29. The method of claim 23 further comprising shaping said components to receive and hold said resilient member at a location at said interface where sealing is desired.

30. The method of claim 23 wherein said resilient member is a static seal.

31. The method of claim 23 wherein said resilient member is in the shape of a closed circular ring.

32. The method of claim 23 wherein said resilient member has a circular cross-section.

33. The method of claim 23 wherein the frequency of said rapid reductions in pressure is between 1 hertz and 10 hertz when said engine is running under load.

34. The method of claim 23 wherein during operation of said engine, said resilient member can be exposed to constant temperatures up to 200° C.

35. The method of claim 34 wherein said resilient member has a chemical backbone comprising p-phenylenediisocyanate.

36. The method of claim 23 wherein said gaseous fuel is a combustible hydrocarbon derivative.

37. The method of claim 23 wherein said gaseous fuel is selected from the group consisting of natural gas, methane, propane, ethane, hydrogen, and blends thereof.

38. The method of claim 23 wherein said components comprise a fuel injection valve and conduits for conveying said gaseous fuel to said fuel injection valve comprise a bore made in an engine cylinder head and said interface is between said fuel injection valve and said cylinder head.

39. The method of claim 23 wherein said component is a conduit defined by a bore made in an engine cylinder head and said interface is between said fuel injection valve and said cylinder head.

40. The method of claim 23 wherein said fuel system comprises a dome-loaded regulator through which said gaseous fuel flows for controlling fuel pressure delivered to a fuel injection valve and said interface is inside said dome-loaded regulator between a reciprocable piston and a cylinder within which said piston is disposed.

* * * * *